DISPENSER WITH HEATING MEANS

Original Filed Jan. 17, 1966 5 Sheets-Sheet 1

INVENTOR
THEODORE R. FLOWERS
BY Grant, Lockwood, Gruenwalt & Dewey ATT'YS.

DISPENSER WITH HEATING MEANS

Original Filed Jan. 17, 1966 5 Sheets-Sheet 2

INVENTOR
THEODORE R. FLOWERS
BY Grant Lockwood
Greenawalt & Dewey ATT'YS.

DISPENSER WITH HEATING MEANS

Original Filed Jan. 17, 1966 5 Sheets-Sheet 3

INVENTOR
THEODORE R. FLOWERS
BY Greist, Lockwood, Greenawalt & Dewey ATT'YS.

DISPENSER WITH HEATING MEANS

Original Filed Jan. 17, 1966 5 Sheets-Sheet 4

INVENTOR
THEODORE R. FLOWERS
BY Greist, Lockwood, Greenwald & Dewey ATT'YS

DISPENSER WITH HEATING MEANS

Original Filed Jan. 17, 1966 5 Sheets-Sheet 5

INVENTOR
THEODORE R. FLOWERS
BY Greist, Lockwood, Greenawalt & Dewey ATT'YS.

United States Patent Office

Re. 27,304
Reissued Mar. 14, 1972

27,304
DISPENSER WITH HEATING MEANS

Theodore R. Flowers, Fairfield, Conn., assignor to Warner-Lambert Company, Milford, Conn.

Original No. 3,358,885, dated Dec. 19, 1967, Ser. No. 521,118, Jan. 17, 1966. Application for reissue Dec. 18, 1969, Ser. No. 10,663
Int. Cl. B67d *5/62*
U.S. Cl. 222—146 HA 5 Claims

Matter enclosed in heavy brackets [ ] appears in the original patent but forms no part of this reissue specification; matter printed in italics indicates the additions made by reissue.

ABSTRACT OF THE DISCLOSURE

A dispensing arrangement for heating and dispensing a product from an aerosol container. The aerosol container is loosely locked within the dispenser in spaced relation thereto and downward movement of the dispenser actuates the aerosol valve, releasing the contents into an electrically heated heat exchanger. Means is provided to release the contents of the can in the event of overheating by the electrical heating means with additional means provided to effect release of the container contents if heated externally.

This invention relates to a heated dispensing arrangement and more specifically is directed to an electrically heated dispenser which is particularly adapted for use with products packaged in pressurized aerosol-type containers.

Broadly speaking, electrical heaters for use with aerosol-type containers are old in the art, however, none of those proposed to date have served to teach the practical art how to design and manufacture an electrically heated dispenser for use with an aerosol-type container which would be commercially feasible. Practically speaking, a variety of reasons may be given for the failure of the prior art to meet this demand. These reasons are mainly centered on design, manufacturing and safety problems in existing designs which preclude their widespread use.

One of the considerations is that of heating the product after it has been released from the container and thereafter continuously discharging it in its expanded form at an elevated temperature without substantially changing its characteristics during such heating. Another consideration confronting those who propose the commercial use of an electrically heated dispensing arrangement for use with aerosol-type containers was one of somewhat greater concern. This had to do with the problem of safety, as aerosol-type containers should not be subject to heating or a heated environment. More specifically, elevating the temperature of the aerosol container above normal ambient temperatures presents a potential hazard which must be avoided especially in commercial products where the intelligence of the users varies. Accordingly, if heating or a heated environment is to be provided for the contents of the aerosol-type container, it must be under carefully controlled circumstances with adequate safety features to protect the users. Additional considerations included properly locating the electrical heating means where it would be precluded from contact with the container contents to eliminate any possible shock hazard, but yet be located for good heat transferring efficiency. Coupled with the foregoing, the usual considerations of manufacturing convenience and economy have prevented wide scale commercialization of electrically heated dispensers usable with aerosol-type containers.

The present invention relates to a new and improved dispensing arrangement having an electrical heating means appropriately located where it may warm a heat exchanger which in turn transfers the heat to a product released from an aerosol-type container. The heat transfer occurs after expansion of the product and does not substantially affect the characteristics prior to discharge from a dispensing nozzle. Suitable means is provided whereby the aerosol-type container is removably locked in the dispenser shell with the nozzle portion in axial alignment with a heat exchange means. Limited relative axial movement between the aerosol-type container and dispenser is permitted whereby the dispensing function will occur when the dispenser shell enclosing the heater and heat exchange means is depressed.

The dispenser is formed from two shell sections which co-operate to form a cylindrical barrel and a dispensing nozzle. A housing closes off one end of the shell and serves as a mounting means for supporting a heat exchanger, and a heater in intimate heat exchange relation. An outlet on the heat exchanger permits release of the expanded product through the dispensing nozzle which is formed integral with the co-operating shell sections. A novel switch arrangement is provided which positively precludes contact by the user with the electrical circuit thereby eliminating the usual hazards.

The present invention permits the use of aerosol-type containers as replaceable cartridges for the heated dispensing arrangement. Obviously, the contents of the aerosol container may be varied to include any substance which may be packaged therein and which is flowable through a heat exchanger to take on heat prior to dispensing. For convenience, however, the present invention will be described in connection with a known type of shaving lather packaged in an aerosol-type container. The aerosol container is provided with a base having means thereon to interlcok it within the cylindrical shell forming the dispensing arrangement which means also serves to limit the longitudinal movement within the shell and provides an additional safety means to effect release of the contents of the aerosol-type containers should overheating occur for any reason. The present design provides a thermostatically controlled switch means which warms the heat exchanger to the desired temperature in a matter of seconds and thereafter maintains it in a heated condition throughout the dispensing function. A modified form of the invention provides means for maintaining the aerosol container and heat exchanger spaced prior to dispensing to prevent any heat transfer to the aerosol container. A better understanding of the salient features of the present invention may be had by a consideration of the objects and attendant detailed description.

It is a principal object of this invention to provide a dispensing device having an electrically heated heat exchange means which warms the contents released from an aerosol-type container.

A further object of this invention is to provide a new and improved dispensing arrangement which is adapted for use with aerosol-type containers of substantially conventional design and which is economically manufactured.

It is a further object of this invention to provide a new and improved dispensing arrangement for dispensing a heated product from aerosol-type containers and having novel safety features to prevent container rupture in the event of accidental overheating.

Additional objects other than those specifically stated will become apparent on consideration of the drawings and when considered in conjunction with the specification and claims.

Figure 1:
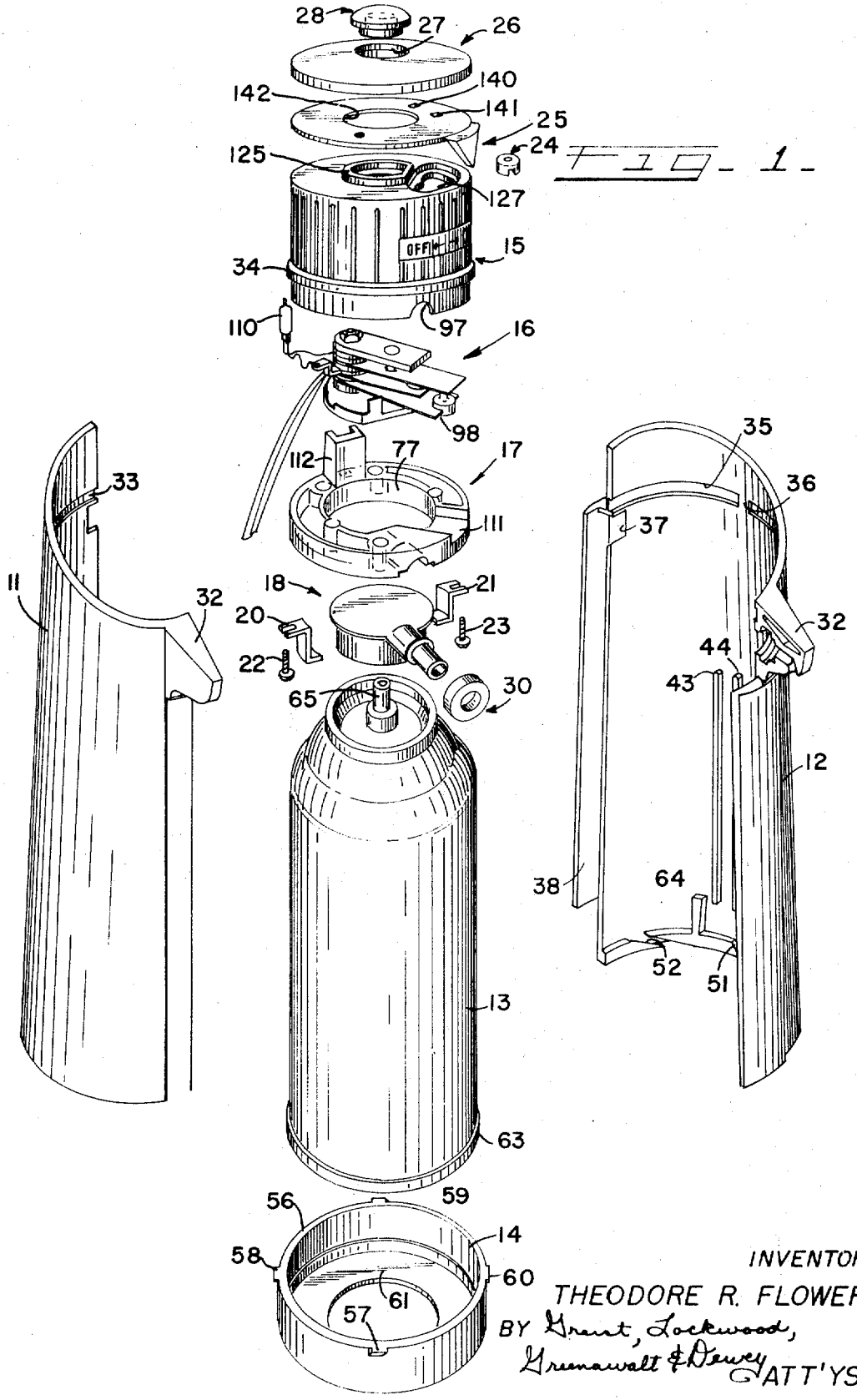
FIG. 1 is an exploded perspective view of the dispensing arrangement of the present invention.
Figure 5:
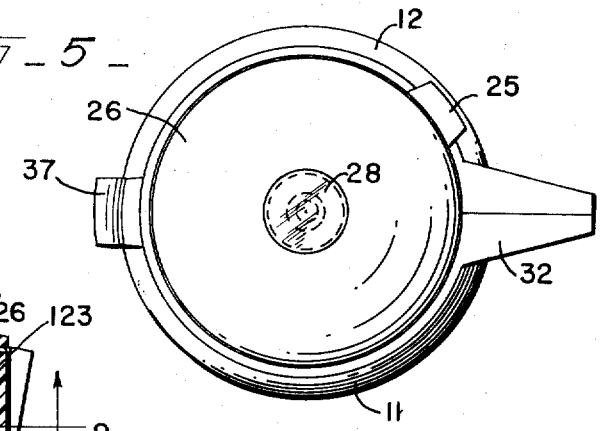
FIG. 5 is a top plan view of the dispensing arrangement of FIG. 2.

The basic arrangement of elements forming the dispensing arrangement of the present invention is illustrated in the exploded perspective view of FIG. 1. A pair of molded shell sections 11 and 12 are shown to the immediate left and right of an aerosol-type container 13 having an annular container base 14 adapted to be disposed around the bottom of the aerosol-type container 13. A housing or hood 15 is adapted to be interfitted within the molded shell sections 11 and 12 and serves to mount a heating means 16 through a mounting ring 17. A heat exchanger 18 is also joined to the mounting ring 17 by mounting brackets 20 and 21 and co-operating fasteners 22 and 23. A back flow seal 30 seals the heat exchanger to the shells 11 and 12 when they are assembled.

A magnet 24, adapted to be positioned in a recess in the top of the housing or hood 15, is covered by a switch lever 25 which in turn is covered by a switch cover plate 26 having a central opening 27. A lens or window 28 is adapted for positioning within the opening 27 and is formed of transparent material to permit viewing of an indicating means which informs the user that the appropriate temperature has been reached and dispensing may commence.

The molded shell sections 11 and 12 form a generally cylindrical bore 31 closed off at one end by the housing 15. The aerosol-type container 13 may be loosely positioned within the bore 31, being locked to the shells by the container base 14.

Figure 6:
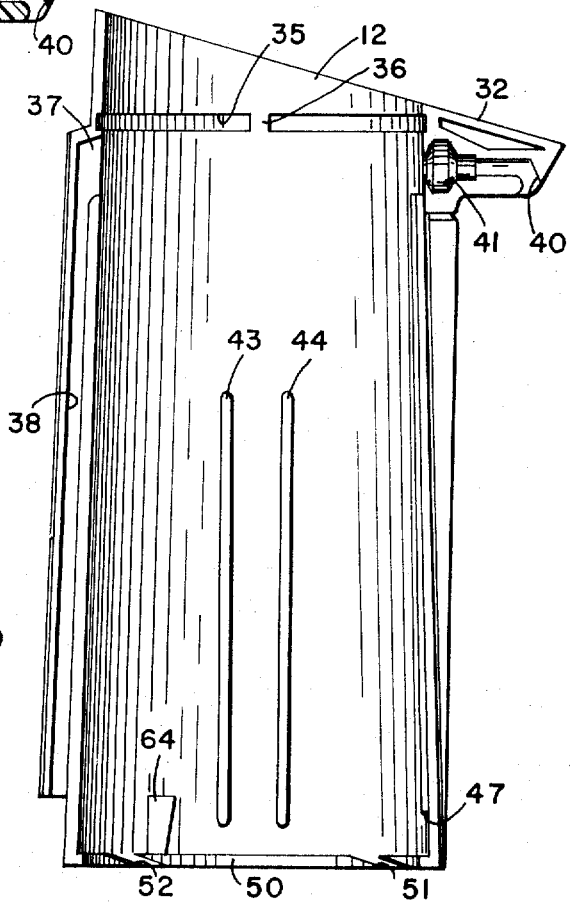
FIG. 6 is a side elevational view of one of the shell sections.

Referring now to FIGS. 1 and 6, it can be observed that the shells 11 and 12 are substantially identical except for minor changes along their longitudinal margins to facilitate joining as will be seen. Each shell section may be formed of plastic by conventional molding techniques and may include one half of the nozzle 32 with the other or co-operating identical half of the nozzle 32 being formed on the other molded shell section. A radially opening groove 33 is formed adjacent the top of the shell 11 while the shell 12 is provided with a similar or corresponding groove 35 both of which serve to mount the housing 15 when assembled. Each of the grooves may be interrupted as shown in the groove 35 at 36 to prevent rotation of the housing 15 within the groove after it is assembled to the shell sections 11 and 12.

Figure 8:
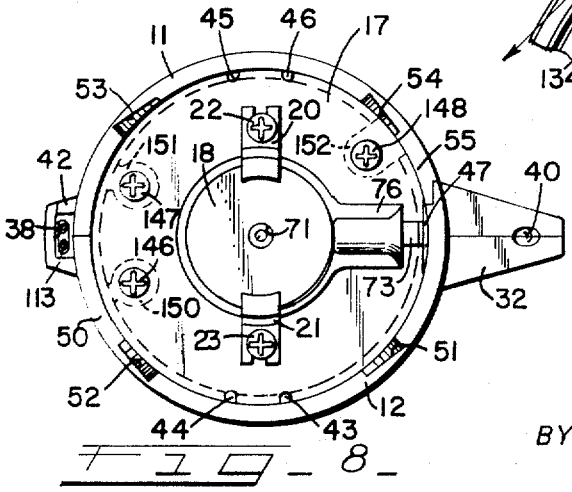
FIG. 8 is a bottom plan view of the dispensing arrangement shown in FIG. 2 with the aerosol-type container omitted.

As seen in FIGS. 1, 6 and 8, the molded shell section 12 is provided with a cord opening 37 in the rear wall communicating with a longitudinally extending groove 38 which opens at the base of the shell 12. This facilitates the reception and positioning of the cord which conducts current to operate the electrical heating element 16. Half of the nozzle 32 carried on the shell section 12 is provided with an opening 40 which is of semi-circular cross section and opens into an annular seal mounting area 41. The other half of the nozzle 32, on the shell 11, is provided with an interior construction which is identical so that the two form an annular seal mounting area and annular passage-way 40 in the nozzle 32.

The open side of cord groove 38 on the shell section 12 is closed off by upstanding rib 42 (FIG. 8) which is molded integral with the shell section 11. Ribs 43 and 44 are formed on the inner wall midway between the longitudinal margins of the shell 12 and project inwardly to form guides to center the container 13. Similar ribs 45 and 46 are formed on the shell section 11 for the same purpose.

The lower end of the shell section 12 is provided with a radially inwardly extending flange 50 which is interrupted by equally spaced inclined grooves 51 and 52. Similar grooves 53 and 54 are provided in the radially inwardly extending flange 55 formed on the base of the body of the shell section 11. Flanges 50 and 55 are substantially continuous when the shell sections 11 and 12 are assembled, being interrupted only by the equally spaced grooves 51–54.

Figure 2:
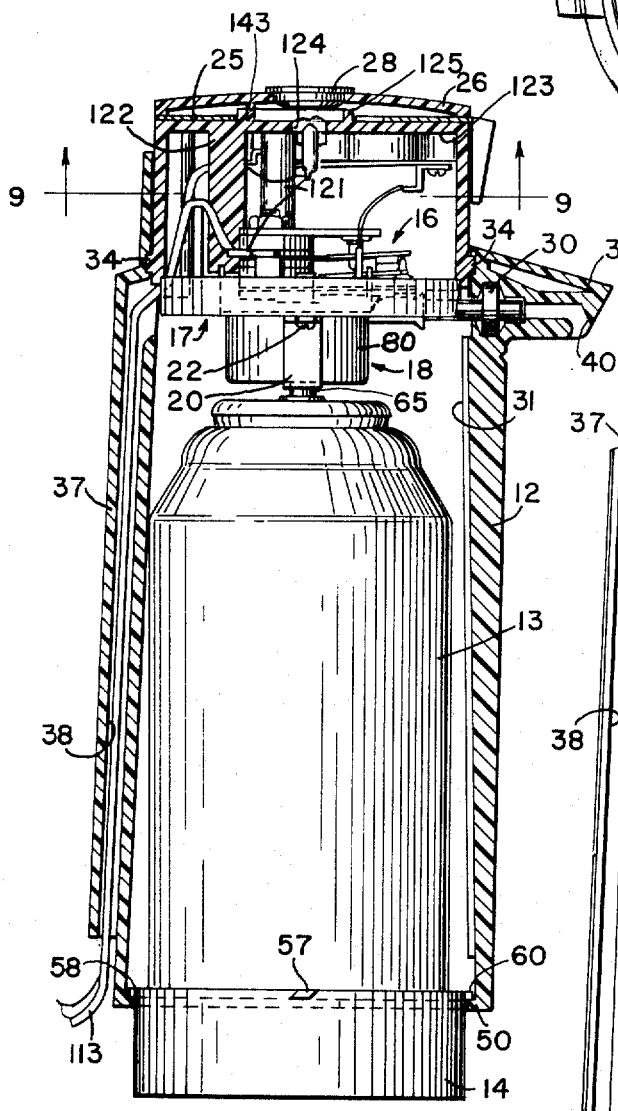
FIG. 2 is an enlarged cross sectional view of the dispensing arrangement of FIG. 1 with the aerosol-type container base, heat exchanger, and heating means illustrated in full elevation.

As seen in FIGS. 1, 2 and 6, the container base 14 includes a circumferential body portion 56 provided with lug 57–60 adjacent one end. At the opposite end is formed a radially inwardly projecting flange 61 which serves to support the base of the container 13. An annular groove 62 is formed in the inner circumferential portion at the junction of the body portion 56 and flange 61. A raised head formed by the roll seam 63 on the container 13 at the junction of the concave bottom wall and side wall of the container 13 is snapped into the groove 62 effectively to lock the container 13 and base 14 together. A stop 64 is formed coextensive with the inner periphery of the flange on the bottom of the shells 11 and 12 and serves to guide the circumferential portion 56 of the base during longitudinal relative movement between the assembled shells and container 13. In addition, the stop 64 serves to limit the rotational movement of the base 14 relative to the shells 11 and 12 inasmuch as it engages one of the radially projecting lugs 57–60.

As seen in FIG. 2, the aerosol-type container 13 is embraced by the shell 12 and has a nozzle portion 65 which projects upwardly for co-operation with the heat exchanger 18. The base 14 is interlocked within the flanges 50 and 55 of the molded shell sections 12 and 11 respectively, to permit the entire dispensing arrangement to be transported as a unit.

The relation of the heat exchanger 18 and heating means is best understood by reference to FIGS. 3–7. The heat exchanger 18 may be of any suitable type with the one shown being of the type described in the copending application, Ser. No. 393,566, now U.S. Patent 3,292,823, entitled Dispenser with Heat Exchanger at its Discharge Outlet and includes an outer shell 70 which is shaped to a cup-like design having a central inlet opening 71 for receiving the nozzle 65 on the container 13. A laterally extending outlet portion 72 fluid-tightly mounts one end of a tubular conduit 73 while the opposite end projects into the nozzle 32 having the outer peripheral portion sealed within the nozzle 32 by means of the back flow sealing member 30. When the contents are released through the heat exchanger 18, they flow out through the opening 40 and may not escape into the chamber 31.

A metal heat transfer strip 74 is formed substantially equal to the depth of the cup 70 and is wound into a spiral configuration with tabs 75 forming spaces to space the outer strips from the preceding strip. Winding of the heat transfer strip is initiated by starting at the opening 71 and continuously winding the strip upon itself so that fluid admitted at the inlet opening 71 will wind spirally around the strip 75 being ultimately released in the outlet opening 72 where it is forced out the opening 40. The spirally wound heat transfer strip 75 has substantial thermal mass and is formed of good heat conducting material which readily absorbs heat from the heating means for release to the fluid passing across the heat transfer surfaces. The details of the heat exchanger construction and function may be found in the application alluded to above.

Crimped around the edges and covering the top margin of the body 70 to form a chamber is a cover 76 which has the center panel portion in intimate engagement with the top edges of the spirally wound strip 74. The cover 76 forms the top half of the lateral opening 72 which mounts the conduit 73. The joint formed by the crimped edges of the cover 76 and the body 70 of the heat exchanger 18 defines an outwardly projecting flange which is received in abutting engagement within an opening 77 in the mounting ring 17. The opening 77 also provides a mounting area for the heater 16 which is disposed in intimate heat transferring relation with the heat exchanger 18.

Figures 3, 4:
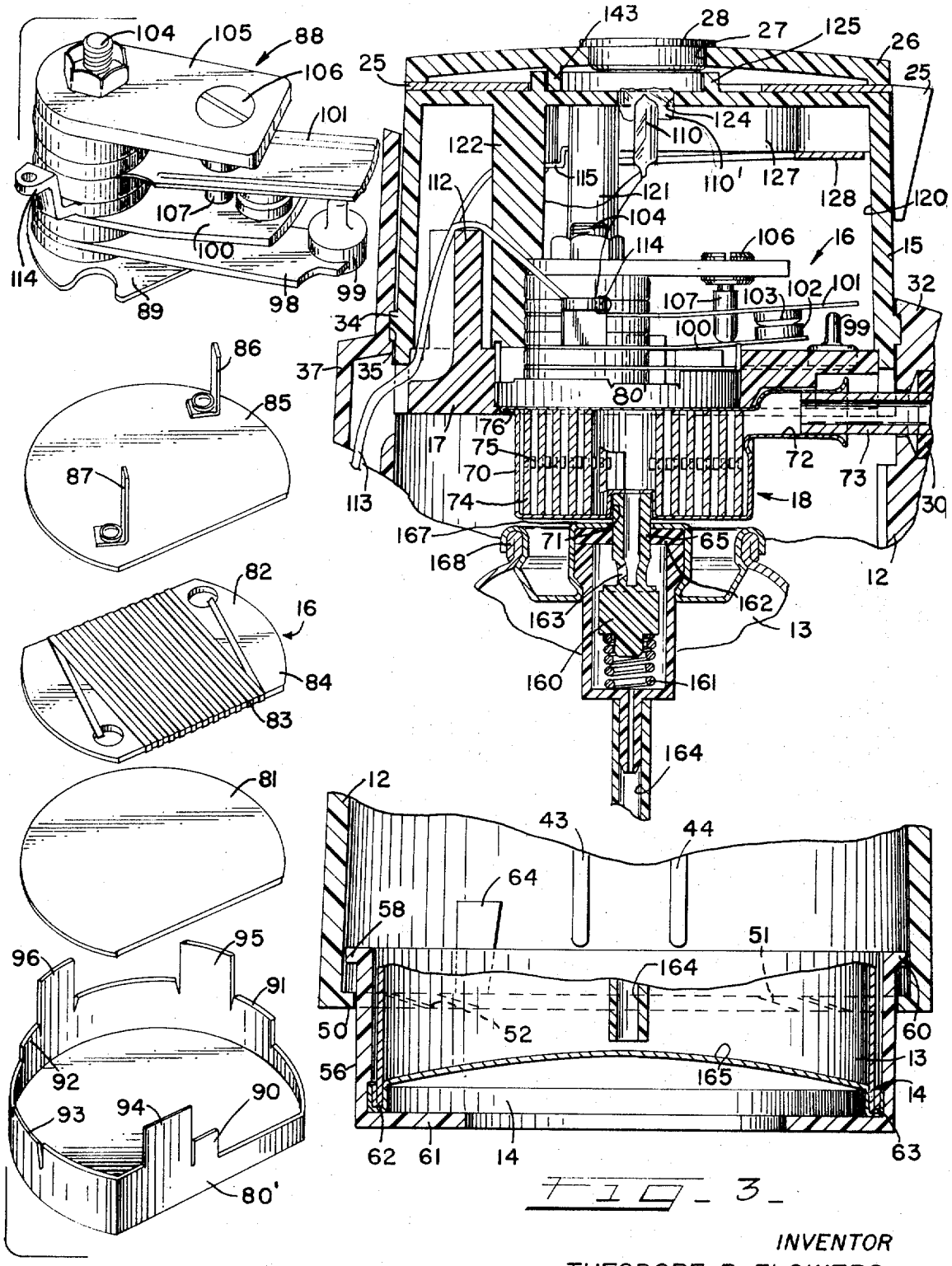
FIG. 3 is an enlarged cross sectional view similar to FIG. 2 illustrating the aerosol-type container and heat exchanger in cross section.
FIG. 4 is an enlarged exploded perspective view of the heating means.
Figure 7:
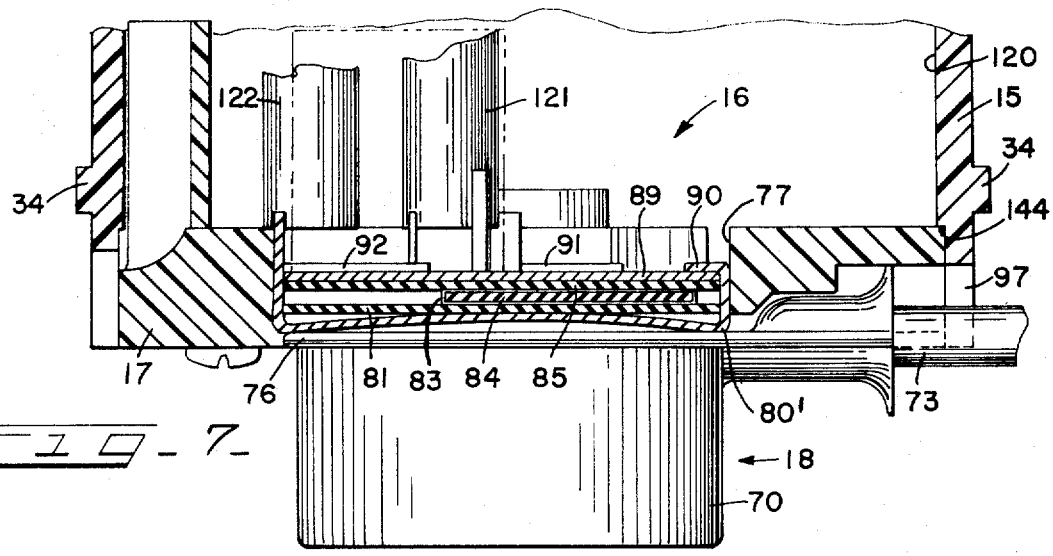
FIG. 7 is an enlarged cross sectional view taken through the housing illustrating the heat exchanger in full elevation and the mounting ring and heating means in cross section.

As best seen in the exploded perspective view of FIG. 4, the heater 16 includes a cup-shaped shell 80' which may be formed of a suitable conducting metal such as aluminum or the like, and may be of generally circular form having a flat chord portion formed along one side to provide a shape which will overlie and contact the top cover 76 of the heat exchanger. The flat chord portion is formed to fit around the raised outlet 72. A layer of mica 81, shaped to the same general configuration as the shell 80', is positioned at the bottom of the heater body 80. A heating element 82 formed of high resistance wire 83 wound on a mica base 84 or the equivalent is disposed on the mica layer 81 and a second mica layer 85 containing terminals 86 and 87 overlies the heating element 82 to form a sandwich with the layer of mica 81 to electrically insulate the heating element 82. The terminals 86 and 87 are joined to the free ends of the high resistance wire 83 to facilitate connection to a power source.

A thermal switch 88 of conventional design is provided with a specially shaped pressure plate 89 which is fastened to the thermal switch 88 and positioned over the layer of mica 85. Cutaway portions are provided on the pressure plate 89 to permit the terminals 86 and 87 to extend upwardly to facilitate wiring. The sandwich containing the heating element 82 and pressure plate 89 of the thermal switch 88 is positioned in the heater body 80 and tabs 90, 91, 92 and 93 are then rolled or bent inwardly to clamp the elements in the stacked relation shown in FIG. 7. The concave shape of the bottom of the heater cup 80' assists in clamping or pinching the heating element 82 for good heat transfer. Positioning lugs 94, 95 and 96 on the body 80 remain axially directed to position the heating means 16 in the housing 15 through engagement with upstanding posts (only 121 and 122 shown in FIG. 7) in the housing 15.

As seen in FIGS. 1, 3 and 4, the thermal switch 88 is of conventional design being available on the open market and includes a bi-metallic element 98 having a ceramic button 99 at one end. Switch blade members 100 and 101 are provided with electrical contacts 102 and 103 respectively, and are serially connected in one side of the power line being mounted on a common mounting post 104 which also serves to clamp an adjusting leaf 105 having a threaded fastener 106. A non-conducting or insulating portion 107 is carried on the tip of the fastener 106 projecting through blade 101 to engage blade 102 thereby permitting the degree of contact of the conducting portions 102 and 103 to be adjusted.

As the bi-metallic element 98 is heated, the tip of the ceramic button 99 engages the blade 101 to separate the electrical contacts 102 and 103. The fastener 106 precludes upward movement of the contact 102. When the bi-metallic element 98 cools, as occurs during release of shaving cream through the heat exchanger 18, the bi-metallic element straightens and the contacts 102 and 103 move to the closed position and heating of the heat exchanger is resumed. A neon lamp 110 of conventional design is wired in parallel with the contacts 102 and 103 and is illuminated when contacts 102 and 103 separate thereby indicating to the user that the heat exchanger has reached the operating temperature.

The mounting ring 17 may be formed of heat resistant plastic and is provided with a central opening 77 which is shaped to receive the heating means 16. A radially projecting groove 111 accommodates the laterally extending bi-metallic element 98 providing adequate freedom for it to flex in response to heating and cooling. An upstanding post 112 is formed at the rear of the mounting ring 17 to elevate and position the cord from the heating means 16. One side of the cord 113 is wired directly to the terminal post 114 on the thermal switch while the other wire is connected to the input terminal 115 on the off-on switch.

As seen in FIGS. 1–3, 7 and 8, the housing 15 is generally cup-shaped, having a bore 120 which houses the heating means 16. The bore 120 is provided with a plurality of axially extending post members 121 and 122 which engage the positioning lugs 95 and 96 respectively. A third post member (not shown) engages the positioning lug 94 so that the heating element is clamped against the posts by the heat exchanger 18 and mounting ring 17. The axially extending posts project from an end wall 123 of the housing 15 having a central opening 124 which is surrounded on the outward side by an axially projecting flange 125. The wall 123 serves as a mount for the switch plate 25 and the switch contacts operated thereby which control the energizing of the heater coil.

The outer side of the end wall 123 is provided with a depression or well 127 which houses the magnet 24. A switch blade 128 has one end fastened to the inner side of the wall 123 with the terminal 115 by fastener 134. The opposite end of the switch blade 128 is free to move and is provided with a button or contact 130 adapted for engagement with a contact 131 carried on a fixed terminal 132 mounted on the wall 123 by means of a threaded fastener 133. Intermediate the button 130 and the threaded fastener 134 is mounted a second button 135 formed of magnetically attractable material.

Figure 10:
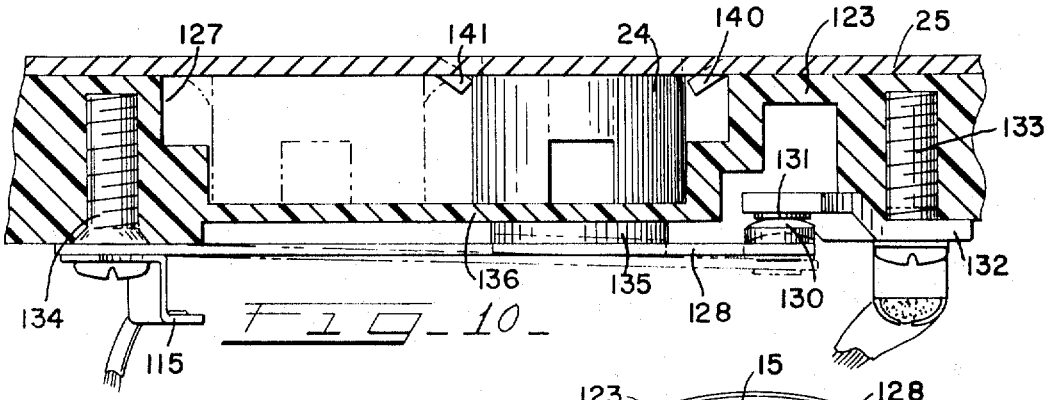
FIG. 10 is a cross sectional view taken generally along the lines 10—10 of FIG. 9.

When the switch blade 128 is in the position shown in FIG. 10, the magnetically attractable button 135, engages the underside of the bottom wall portion 136 in the well 127, due to the attraction of the magnet 24 which is shown in solid lines positioned directly over the button 135. When the magnet is moved angularly to the position shown in phantom lines, the switch blade 128, due to its natural resilience, moves to the position shown in phantom lines, separating the contacts 130 and 131 to interrupt the circuit between the terminals 115 and 132 and the flow of power applied to the heating means 16.

Suitable means is provided to shift the magnet 24 between the "off" and "on" positions which positions may be labeled by means of suitable indicia. The switch lever 25 is provided with downwardly struck tabs 140 and 141 which engage opposite sides of the magnet 24 for shifting it in the well 127 in response to rotation of the switch plate 25. Total angular movement of the switch lever 25 is limited by the magnet engaging opposite end walls of the well 127. On the outward facing part of the end wall 123, the axially projecting flange 125 is received in an opening 142 in the switch plate to provide a bearing or guide surface around which the switch plate rotates between the "on" and "off" positions.

The switch cover plate 26 has an axially projecting flange 143 which is interfitted within and adhesively joined to the axially directed flange 125 and serves to align the opening 27 in the cover plate with the opening 124 in the center of the wall 123. When the clear plastic lens 28 is inserted, it is aligned with the lamp 110 which is positioned in alignment with the opening 124 where it may be easily seen through the lens 28. The lamp 110 is joined to the housing 15 by a waterproofing cap 110' which seals the opening 124.

The mounting ring 17 supporting the heat exchanger and the heating means is positioned in the housing 15 after the necessary electrical connections are made. The power cord 113 is brought over the post 112 and the mounting ring 17, is brought into abutment with a shoulder 144 which extends around the lower margins of the side walls of the housing 15. Threaded fasteners 146, 147 and 148 extend through the mounting ring 17 into posts 150, 151 and 152 formed integral with the housing 15 and having the upper end disposed at the same elevation as the shoulder 144. The mounting posts 150, 151 and 152 are shown in dotted lines in FIG. 8 and may be of any desired construction.

The housing sub-assembly, consisting of the assembled switch, heating means, cover plate, lens, water proofing cap, and heat exchanger mounted in the housing 15, is then inserted into the shells with the annular rib 34 on the housing 15 receive the grooves 33 and 35 in each of the shells 11 and 12. The shells may be secured by mechanical means or an adhesive after the cord is properly positioned in the cord groove 38. The aerosol container 13 having the base 14 assembled thereon may then be inserted within the bore 31 and locked in place and the unit is ready for use.

Figure 9:
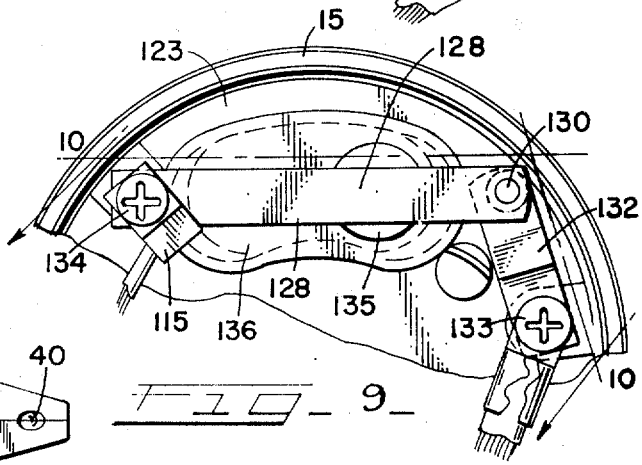
FIG. 9 is a fragmentary cross sectional view taken through the housing generally along the lines 9—9 of FIG. 2 illustrating the magnetically operated switch.

In operation, the switch plate 25 is rotated so that the pointer is axially aligned with the "on" indicia where the magnet 24 is disposed over the button 135 where it draws the switch contacts 130 and 131 into engagement as shown in FIGS. 9 and 10. Since the bi-metallic element in the thermal switch is cold, the heater contacts 102 and 103 are in the engaged or conducting condition shown in FIG. 3, completing the circuit through the resistance element 83 and causing it to heat. Heat from the shell 80 is transferred to the heat exchanger 18 through the cover plate 76 to the individual spirals on the heat exchange element 74 to elevate the temperature. As soon as the operating temperature is reached, the contacts 102 and 103 are automatically broken by the button 99 on the bi-metallic element on the thermal switch and the indicating lamp 110 will be illuminated and dispensing may commence. Light downward force may be applied to the cover plate 26 causing the nozzle 65 to move inwardly of the aerosol container 13 to release the contents.

As shown in FIG. 3, the valve arrangement of the container 13 consists of a plunger element 160 formed integral with the nozzle 65. A biasing spring 161 urges the plunger 160 to seat against the top wall 162 to preclude the passage of fluid out the nozzle 65, however, when the nozzle 65 is depressed, a lateral opening 163 formed in the tubular nozzle 65 is moved past the fixed valve seat 162 permitting communication through the flexible hose 164 which extends to the bottom 165 of the container 13. Fluid may then pass through the hose 164, the spring 161, around the plunger 160 and out the opening 163 into the heat exchanger, where it is expanded into a foam which is continuously forced around the spirally wound heat exchange element to take on heat. As more fluid is released, the heated foam is continuously emitted from the outlet opening through the nozzle 40 where it may be applied to the shaver's face in a known manner.

One important feature of the invention in addition to those described, is the relationship of the container to the bore 31 in the shells 11 and 12 which embraces the same. Sufficient axial movement between the container and shells 11 and 12 is available so that the nozzle 65 may be depressed releasing the contents from the container

13. Should overheating of the container 13 occur for any cause, such as, for example, failure of the thermal switch, the valve nozzle 65 and integral plunger 160 are of plastic material which will melt at 500–700° F. This temperature will be reached by the valve well in advance of overheating of the container inasmuch as the nozzle 65 actually touches the heat exchanger. As the nozzle 65 melts the entire dispenser will drop, continue its downward travel until the ends of the guides 43–46 and an inwardly projecting ledge 47 at the junction of the shells 11 and 12 engage the top of the container base 14. If the melting has caused failure of the valve the pressurized product will be released from the container. In the absence of the stops or the failure to engage the base to arrest downward movement to maintain the container 13 and heat exchanger separated, the valve housing 167 in the container being disposed above the outer rim 168 engages the heat exchanger 18 as the nozzle 65 melts to cause further melting of the valve plunger 160 releasing the pressurized product and alleviating any danger.

Figure 11:
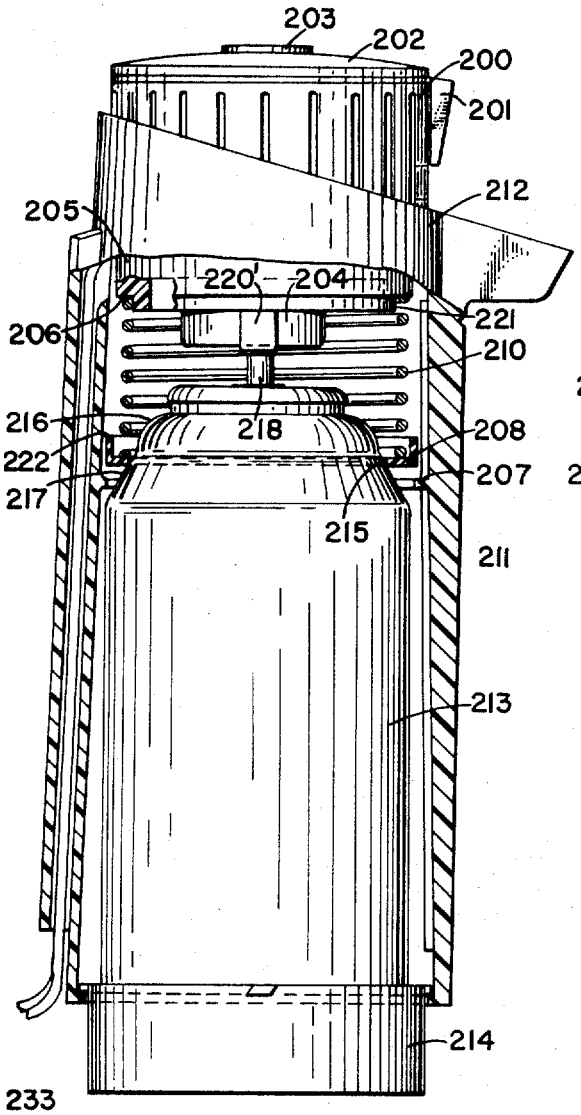
FIG. 11 is a view similar to FIG. 2 of a modified form of dispensing arrangement having a means to maintain the aerosol-type container spaced from the heat exchanger.
Figure 12:
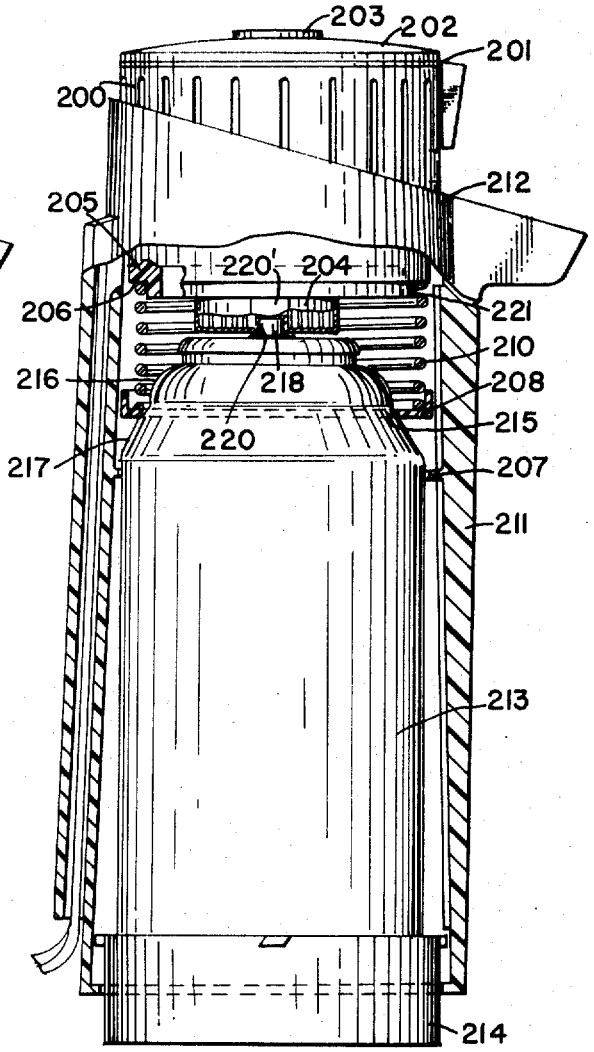
FIG. 12 is a view similar to FIG. 11 with the aerosol-type container in the dispensing position.

Referring now to FIG. 11, a modified form of the invention is illustrated with portions of the shell broken away to show the aerosol-type container and attached base in full elevation. The construction shown in FIGS. 11 and 12 is similar to the dispensing arrangement shown previously and the housing 200, switch 201, switch plate 202, and lens 303 may be identical to those previously described. The housing 200 contains a heating means (not shown) and heat exchanger 204 mounted by a bracket 220' to a mounting ring 205. The mounting ring 205 is substantially identical to the mounting ring shown in the embodiment of FIGS. 1–10 with the exception that it is formed with an axially facing spring seat shoulder 206 on the underside portion. The shell sections 211 and 212 are also similar to the shell sections 11 and 12 except that each is provided with an inwardly projecting flange 207 forming a stop for an annular washer 208 in addition to being slightly greater in over-all length. A coil spring 210 has one end received around the circumferential spring guide flange 221 and is bottomed against the spring seat shoulder 206. The opposite end of the spring 210 is in engagement with the washer 208 and includes a centering flange 222.

The radial flange 207 retains the spring 210 and washer 208 within the shell 211 and 212 when aerosol-type container 213 is withdrawn by unlocking the base 214 from the shells in the manner described previously. The washer 208 has an inside diameter 215 which is greater than the diameter of the upper neck 216 of the aerosol-type container but less than the over-all diameter of the body so that the washer seats on the frusto-conical surface 217 joining the upper neck 216 and the main body of the aerosol-type container 213. The force developed by the spring 210 is sufficient to maintain the nozzle 218 on the aerosol-type container spaced from the heat exchanger 204 in the absence of external force thus preventing any heat transfer through the nozzle to the container proper. It is contemplated that the thermostatically operated heating unit will be set for a maximum temperature which will be suitable for shaving but well below the upper design limits of the aerosol-type container 213 so heat transfer normally is not a problem, however, the spaced arrangement protects against this.

To effect dispensing in the embodiment of FIG. 11, downward force is applied to the switch plate 202 causing the nozzle 218 to enter an opening 220 in the heat exchanger 204. The downward force must be of sufficient magnitude to overcome the combined force effects on the spring 210 and the valve spring (not shown) which is carried internally of the aerosol-type container. When the force is released, the spring 210 returns the dispenser and aerosol-type container to the relative condition shown in FIG. 11, and the valve spring cuts off product flow in a well known manner.

It is to be appreciated that the spacing between the heat exchanger 204 and the nozzle 218 of the aerosol-type container 213 is sufficient to prevent heat transfer to the latter. Since the only available heat path is through the shoulder 206, spring 210 and inner diameter of the washer 208, direct heating of the container 213 is possible. Should heat transfer through the spring present a problem, a second flange may be formed integral with the shells 211 and 212 above the flange 207 to provide a longer heat path. In such event, the mounting ring 17 of FIG. 1 may be used in the embodiment of FIGS. 11 and 12.

When the aerosol-type container 213 is removed by unlocking the base 214 from the shells 211 and 212, the shoulder 207 arrests the downward travel of the washer 208 maintaining the spring tensioned slightly. When a fresh container is inserted, the frusto-conical surface 217 is centered within the washer and assists in aligning the nozzle 218 with the inlet opening 220 and the heat exchanger 204.

Figure 13:
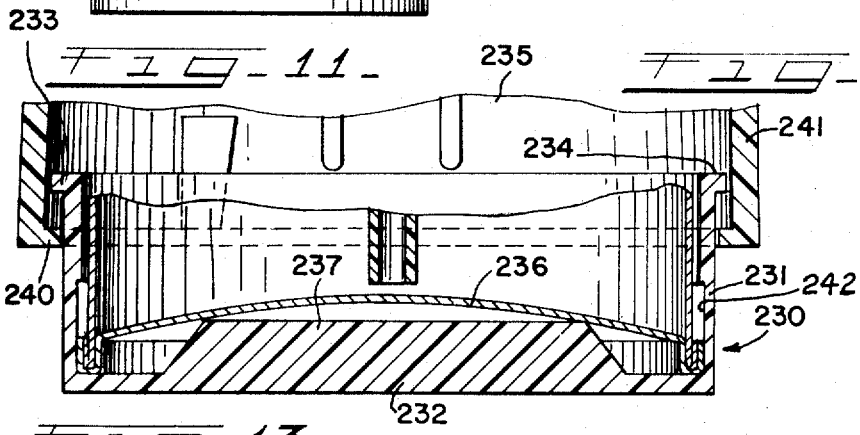
FIG. 13 is a fragmentary cross sectional view of a modified form of container base.

Referring now to FIG. 13, a modified form of container base 230 is illustrated in cross section having upstanding side walls 231 and a bottom wall 232. The inner construction of the container base 13 is similar to that illustrated in FIG. 3, having flanges 233 and 234 for interlocking wtih the flange 240 the shell sections 241 embracing the aerosol container 235. The container 235 is provided with a concave bottom 236 like that illustrated in the embodiment of FIG. 3, however, the bottom of the container base 230 in FIG. 13 is thickened to engage the concave bottom 236. With this container base construction, should over-heating of the container occur for any cause, the concave bottom 236 will assume a convex shape prior to failure of the container. This change in shape is sufficient to increase the over-all dimension of the container 13 so that the lugs 233 and 234 engage the lower flange 240 on the shell sections 241 and the now convex bottom 236 reacts against the base 230 to press the nozzle against the heat exchanger (not shown). As the bottom 236 assumes a convex shape, the seam at the margin of the can slides upwardly in the groove 242 and the nozzle of the container 235 is depressed to release the pressurized product and eliminate the hazard.

After considering the foregoing, it can be appreciated that the dispenser of the present invention avoids the problems and disadvantages of the prior art. In addition, an attractive compact dispenser is provided which is economical to produce and sufficiently rugged to endure the expected abuse. Changing of the aerosol-type container may be accomplished with unequaled ease by merely twisting the base about one-fourth of a turn to permit the lugs 57–60 to travel down the slots 51–54. The aerosol-type container does not need any special adapter since the conventional nozzle normally supplied with each is fluidtightly received in the opening 70 in the heat exchanger.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. In combination, an aerosol container and a dispensing arrangement for use in dispensing a pressurized product from said aerosol container in a heated condition, said aerosol container having a depressible nozzle portion which operates a valve to release the product from said container, said dispensing arrangement including a hollow shell closed off at one end by a housing portion, said shell enveloping at least a part of said aerosol container, electrical heating means mounted in said housing portion of said shell in engagement with a heat exchanger, said heat exchanger having an inlet and an outlet and being mounted between said electrical heating means and said aerosol container, said inlet being adapted to receive the nozzle on said aerosol container for releasing said product for passage through said heat exchanger whereby said product will be warmed before leaving said outlet, [and] means mounted on said aerosol container and engaging said hollow shell [to permit limited longitudinal movement] when assembled thereto to maintain it [loosely and] removably positioned within said shell with said nozzle located in axial alignment with said inlet on said heat exchanger, *and means operatively associated with said housing portion for depressing said nozzle.*

2. The dispensing arrangement of claim 1 wherein said aerosol container has a portion thereof which houses said nozzle disposed above the remaining portion of said aerosol container whereby failure of said heating means causing overheating will result in melting said nozzle within said portion of said aerosol container to continuously release said product.

3. The combination of claim 1 wherein said means mounted on said aerosol container to maintain it [loosely and] removably joined to said shell comprises a continuous annular base joined to said aerosol container and locked into said shell for relative movement between defined limits to permit dispensing.

4. The dispensing arrangement of claim 3 wherein said aerosol container is provided with a bowed bottom wall portion and means is provided on said base for engagement by said bowed position when distorted by excessive internal pressure in said container to move said container relative to said shell and said base thereby initiating dispensing to relieve the excessive internal pressure.

5. The dispensing arrangement of claim 1 including means to maintain said heat exchanger spaced from said aerosol container during periods of non-dispensing.

References Cited

The following references, cited by the Examiner, are of record in the patented file of this patent or the original patent.

UNITED STATES PATENTS

| | | | |
|---|---|---|---|
| 3,338,476 | 8/1967 | Marcoux | 222—146 HA |
| 2,914,222 | 11/1959 | Meshberg | 222—162 |
| 3,302,834 | 2/1967 | Alsop | 222—183 X |
| 3,347,423 | 10/1967 | Rahn et al. | 222—183 |
| 3,487,979 | 1/1970 | Altounyan et al. | 222—183 |
| 888,488 | 5/1908 | Gurley | 222—54 |
| 2,148,986 | 2/1939 | Hoyt | 239—75 |
| 2,822,961 | 2/1958 | Seaquist | 222—397 |
| 2,914,222 | 11/1959 | Meshberg | 222—162 |
| 2,966,283 | 12/1960 | Darvie | 222—162 X |
| 3,098,925 | 7/1963 | Fouts et al. | 222—146 X |
| 3,134,191 | 5/1964 | Davis | 222—146 X |
| 3,144,174 | 8/1964 | Abplanalp | 222—146 |
| 3,292,823 | 12/1966 | Weidman et al. | 222—394 X |

STANLEY TOLLBERG, Primary Examiner